US010856060B2

(12) United States Patent
Yeh et al.

(10) Patent No.: US 10,856,060 B2
(45) Date of Patent: Dec. 1, 2020

(54) ELECTRONIC DEVICE WITH SPEAKER MODULE

(71) Applicants: Hsin Yeh, Taipei (TW); Jyh-Chyang Tzou, Taipei (TW); Cheng-Ya Chi, Taipei (TW); Pai-Feng Chen, Taipei (TW)

(72) Inventors: Hsin Yeh, Taipei (TW); Jyh-Chyang Tzou, Taipei (TW); Cheng-Ya Chi, Taipei (TW); Pai-Feng Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/388,874

(22) Filed: Apr. 19, 2019

(65) Prior Publication Data

US 2019/0327544 A1 Oct. 24, 2019

Related U.S. Application Data

(60) Provisional application No. 62/660,256, filed on Apr. 20, 2018.

(51) Int. Cl.
*H04R 1/02* (2006.01)
*H04R 1/28* (2006.01)
(Continued)

(52) U.S. Cl.
CPC ........... *H04R 1/025* (2013.01); *G06F 1/1658* (2013.01); *G06F 1/1677* (2013.01);
(Continued)

(58) Field of Classification Search
CPC .......... H04R 1/02; H04R 1/025; H04R 1/028; H04R 1/2803; H04R 1/345;
(Continued)

(56) References Cited

U.S. PATENT DOCUMENTS 6,181,550 B1 * 1/2001 Kim ..................... G06F 1/1616
361/679.06
7,453,440 B2 11/2008 Sun
(Continued)

FOREIGN PATENT DOCUMENTS

| CN | 104486704 | 4/2015 |
| TW | M488720 | 10/2014 |
| TW | I479409 | 4/2015 |
| TW | 201821869 | 6/2018 |

*Primary Examiner* — Jesse A Elbin
(74) *Attorney, Agent, or Firm* — JCIPRNET

(57) ABSTRACT

An electronic device includes a first body, a second body, and a speaker module. The first body includes a first housing and a second housing disposed on the first housing. The second body is pivotally connected to the first body. The speaker module is movably disposed in the first body. The first body has a first surface and a second surface, and the first surface and the second surface are respectively located at two opposite sides of the speaker module. When the speaker module is abutted against the first surface, the speaker module resonates with the first housing to emit a first sound. When the speaker module is abutted against the second surface, the speaker module resonates with the second housing to emit a second sound.

20 Claims, 16 Drawing Sheets

(51) Int. Cl.
*H04R 1/34* (2006.01)
*G06F 1/16* (2006.01)
*H04M 1/02* (2006.01)

(52) U.S. Cl.
CPC .............. *G06F 1/1688* (2013.01); *H04R 1/02* (2013.01); *H04R 1/028* (2013.01); *H04R 1/2803* (2013.01); *H04R 1/345* (2013.01); *G06F 1/1616* (2013.01); *H04M 1/022* (2013.01); *H04R 2440/07* (2013.01); *H04R 2499/15* (2013.01)

(58) Field of Classification Search
CPC ............ H04R 2440/07; H04R 2499/15; G06F 1/1616; G06F 1/1658; G06F 1/1677; G06F 1/1688; H04M 1/022
USPC ....... 381/305, 306, 333, 152, 162, 387, 388, 381/395
See application file for complete search history.

(56) References Cited

U.S. PATENT DOCUMENTS

| | | | |
|---|---|---|---|
| 8,265,317 B2* | 9/2012 | Tseng | H04R 1/2811 381/332 |
| 2010/0046151 A1* | 2/2010 | Baller | G06F 1/1616 361/679.01 |
| 2018/0184185 A1* | 6/2018 | Ent | H04R 1/026 |
| 2019/0107867 A1* | 4/2019 | Chiang | H03G 7/002 |
| 2019/0208327 A1* | 7/2019 | Ge | H04R 1/02 |

* cited by examiner

ELECTRONIC DEVICE WITH SPEAKER MODULE

CROSS-REFERENCE TO RELATED APPLICATION

This application claims the priority benefits of U.S. provisional application Ser. No. 62/660,256, filed on Apr. 20, 2018. The entirety of the above-mentioned patent applications is hereby incorporated by reference herein and made a part of specification.

BACKGROUND OF THE INVENTION

Field of the Invention

The invention is related to an electronic device, and more particularly, to an electronic device with a speaker module.

Description of Related Art

In the conventional notebook computer, the speaker module is disposed on the inner side of at least one of the two bodies, such that when the two bodies are unfolded relative to each other, the sound of the speaker module may be transmitted from between the two bodies. However, the speaker module is disposed on the inner side of the two bodies, and there is an issue that the sound emitted by the speaker module is suffocated between the two bodies when the two bodies are closed relative to each other.

SUMMARY OF THE INVENTION

The invention provides an electronic device with a speaker module that can solve the issue that a sound emitted by the speaker module is suffocated between two bodies when the two bodies of the electronic device are closed relative to each other.

An electronic device of the invention includes a first body, a second body, and a speaker module. The first body includes a first housing and a second housing disposed on the first housing. The second body is pivotally connected to the first body. The speaker module is movably disposed in the first body. The first body has a first surface and a second surface, and the first surface and the second surface are respectively located at two opposite sides of the speaker module. When the speaker module is abutted against the first surface, the speaker module resonates with the first housing to emit a first sound. When the speaker module is abutted against the second surface, the speaker module resonates with the second housing to emit a second sound.

In an embodiment of the invention, the electronic device further includes a linkage mechanism. The linkage mechanism is connected to the first body. The speaker module is connected to the linkage mechanism. The linkage mechanism drives the speaker module to be abutted against the first surface or abutted against the second surface.

In an embodiment of the invention, the first body is closed relative to the second body, and the speaker module is abutted against the first surface.

In an embodiment of the invention, the first body is unfolded relative to the second body, and the speaker module is abutted against the second surface.

In an embodiment of the invention, the linkage mechanism includes a hinge module, a gear set, and a connecting rod set. The hinge module is connected between the first body and the second body. The gear set is connected to the hinge module. The connecting rod set is pivotally connected to the gear set. The speaker module is fixed to the connecting rod set or pivotally connected to the connecting rod set.

In an embodiment of the invention, the gear set includes a first gear and a second gear. The first gear is fixed to the hinge module. The second gear is engaged with the first gear and pivotally connected to the connecting rod set.

In an embodiment of the invention, the first body drives the hinge module to rotate. The hinge module drives the first gear to rotate. The first gear drives the second gear to rotate. The second gear drives the connecting rod set to move. The connecting rod set drives the speaker module to be abutted against the first surface or abutted against the second surface.

In an embodiment of the invention, the linkage mechanism further includes a sliding recess. The sliding recess is disposed at the first body. The connecting rod set includes a first connecting rod, a second connecting rod, a first shaft, and a second shaft. The first connecting rod is pivotally connected to the gear set. The first shaft is connected between the first connecting rod and the second connecting rod, and slidably disposed in the sliding recess. The second shaft is disposed at the first body. The second connecting rod is pivotally connected to the second shaft. The speaker module is fixed to the second connecting rod or pivotally connected to the second connecting rod.

In an embodiment of the invention, the first connecting rod includes a telescopic rod.

In an embodiment of the invention, the first body drives the hinge module to rotate. The hinge module drives the gear set to rotate. The gear set drives the first connecting rod to swing. The first connecting rod drives the second connecting rod to rotate. The second connecting rod drives the speaker module to be abutted against the first surface or abutted against the second surface.

In an embodiment of the invention, the linkage mechanism includes a power source and a connecting rod. The power source is disposed at the first body. The connecting rod is pivotally connected to the power source, and pivotally connected to the first body.

In an embodiment of the invention, the power source pushes the connecting rod to swing, such that the connecting rod drives the speaker module to be abutted against the first surface or abutted against the second surface.

In an embodiment of the invention, an extending direction of the first surface, an extending direction of the second surface, and an extending direction of the second housing are parallel to each other.

In an embodiment of the invention, an extending direction of the first surface and an extending direction of the second housing have an angle. An extending direction of the second surface and the extending direction of the second housing have the angle.

In an embodiment of the invention, the first body includes a first protrusion and a second protrusion. The first protrusion is protruded from the first housing. The first surface is located at the first protrusion. The second protrusion is protruded from the second housing. The second surface is located at the second protrusion.

In an embodiment of the invention, the first housing has the first surface. The second housing has the second surface.

In an embodiment of the invention, the speaker module includes a speaker unit. The speaker module is abutted against the first surface or abutted against the second surface via the speaker unit.

In an embodiment of the invention, the electronic device further includes a sensing module, a driving module, and a processor. The driving module is disposed in the first body, and connected to the speaker module. The processor is electrically connected to the sensing module and the driving module. The processor is configured to control the driving module according to a signal provided by the sensing module, such that the driving module drives the speaker module to be abutted against the first surface or abutted against the second surface.

In an embodiment of the invention, the speaker module includes a speaker unit and a cover layer covering an outside of the speaker unit. The speaker module is abutted against the first surface or abutted against the second surface via the cover layer.

In an embodiment of the invention, the speaker module has a first combining member and a second combining member. The first housing has a third combining member cooperating with the first combining member. The second housing has a fourth combining member cooperating with the second combining member. The speaker module is combined with the third combining member via the first combining member, or the speaker module is combined with the fourth combining member via the second combining member.

Based on the above, in the electronic device of the invention, the sound of the speaker module may be directly transmitted to the outside of the electronic device regardless of whether the first body is unfolded or closed relative to the second body.

In order to make the aforementioned features and advantages of the disclosure more comprehensible, embodiments accompanied with figures are described in detail below.

DESCRIPTION OF THE EMBODIMENTS

Figure 1A:
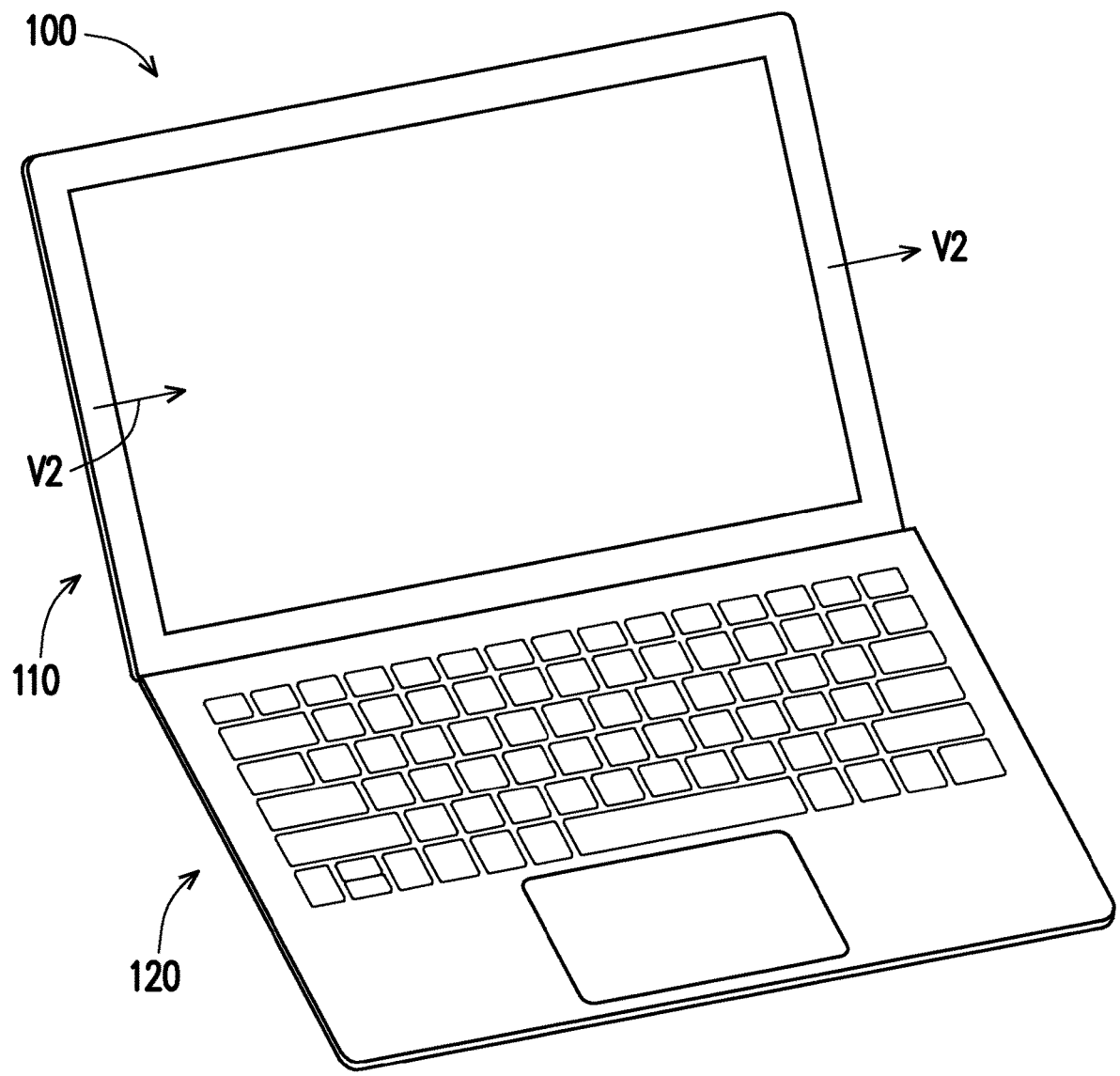
FIG. 1A is a perspective schematic view of an electronic device of the first embodiment of the invention when unfolded.
Figure 1B:
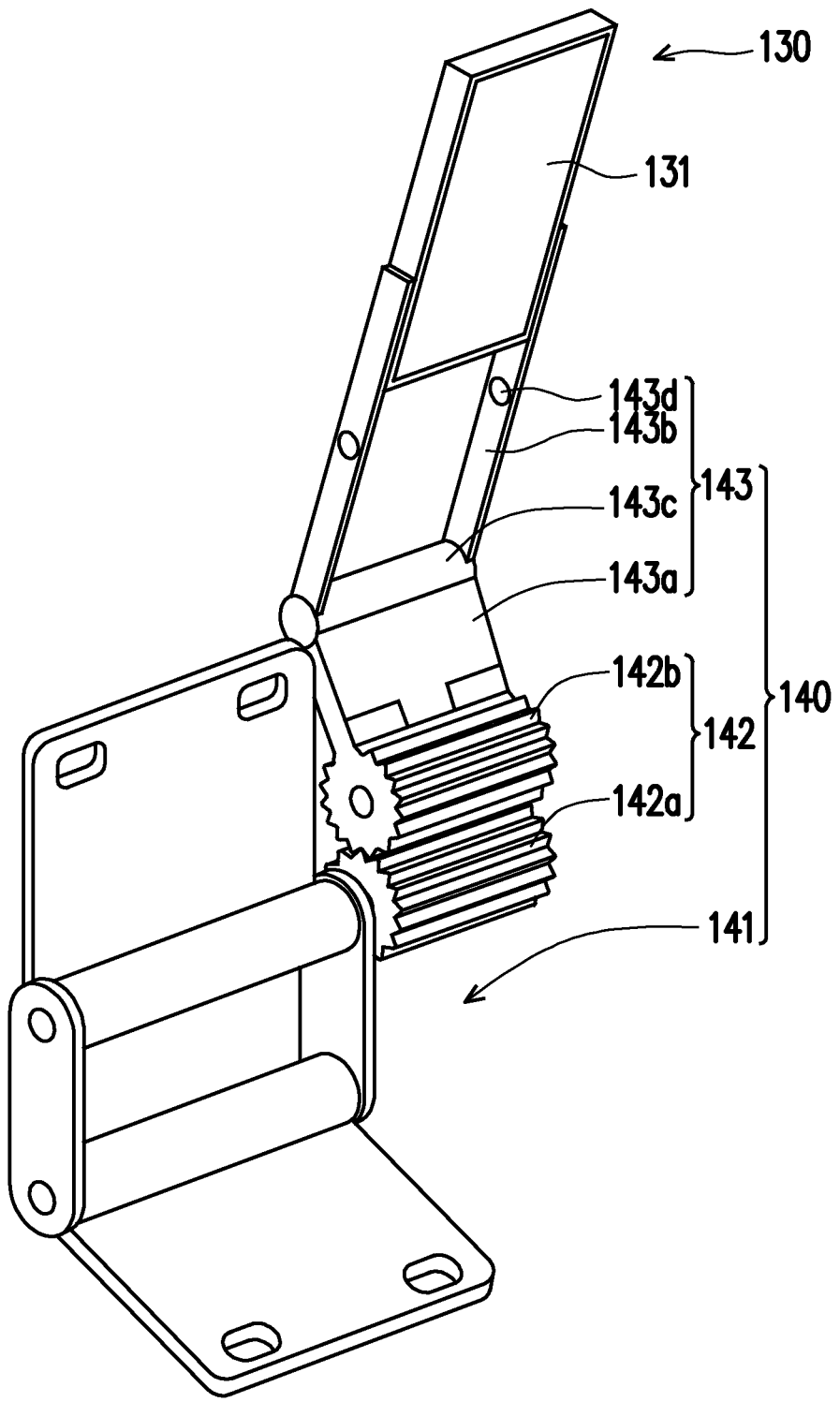
FIG. 1B is a perspective schematic view of a linkage mechanism of the electronic device of FIG. 1A.
Figure 1C:
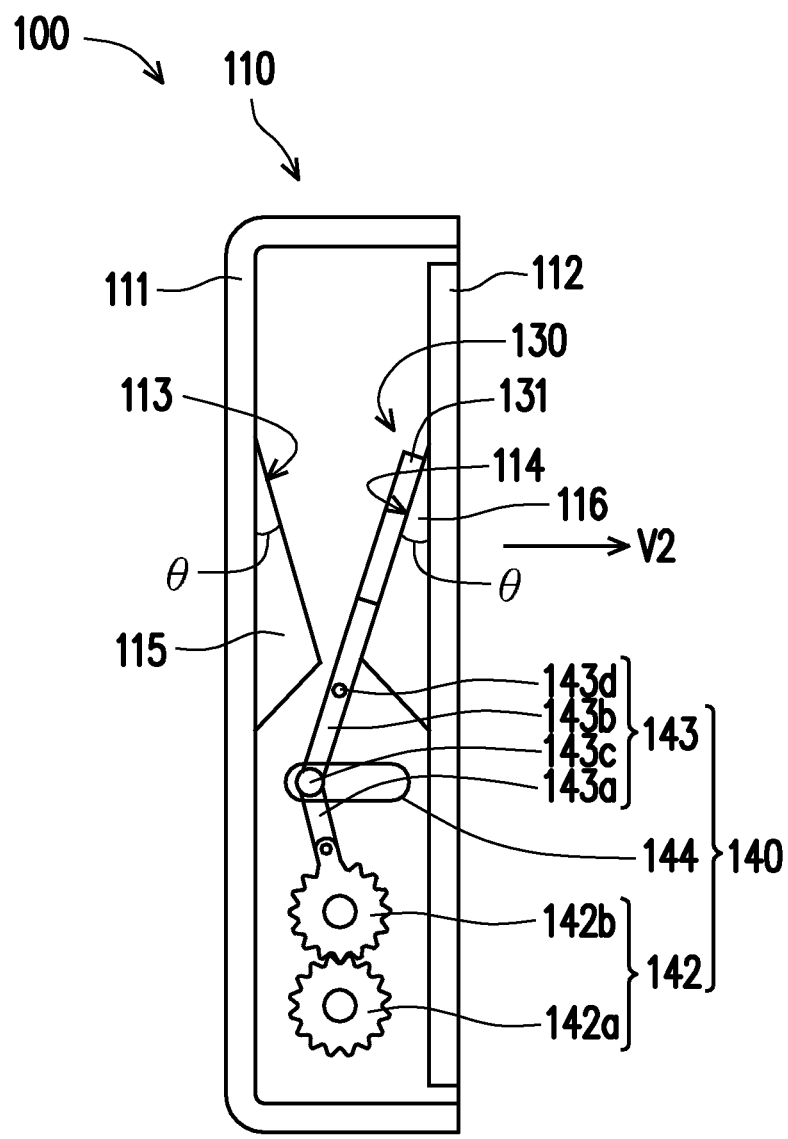
FIG. 1C is a partial cross section schematic view of the electronic device of FIG. 1A.

FIG. 1A is a perspective schematic view of an electronic device of the first embodiment of the invention when unfolded. FIG. 1B is a perspective schematic view of a linkage mechanism of the electronic device of FIG. 1A. FIG. 1C is a partial cross section schematic view of the electronic device of FIG. 1A. Referring to FIG. 1A, FIG. 1B, and FIG. 1C, an electronic device 100 includes a first body 110, a second body 120 and a speaker module 130. The second body 120 is pivotally connected to the first body 110. The speaker module 130 is movably disposed in the first body 110.

In the present embodiment, the first body 110 is, for example, but not limited to, a body provided with a display screen, and the second body 120 is, for example, but not limited to, a body provided with an input module such as a keyboard or a touch pad. Here, the state of the electronic device 100 shown in FIG. 1A is defined as a general notebook computer mode.

In other embodiments, the first body 110 and the second body 120 may both be provided with a display screen, and the display screen may or may not have a touch function, depending on requirements.

Specifically, the first body 110 of the present embodiment includes a first housing 111, a second housing 112, a first surface 113 and a second surface 114. The second housing 112 is disposed on the first housing 111. The first surface 113 is disposed at the first housing 111. The second surface 114 is disposed at the second housing 112. The speaker module 130 is configured to be movable between the first housing 111 and the second housing 112.

Figure 2A:
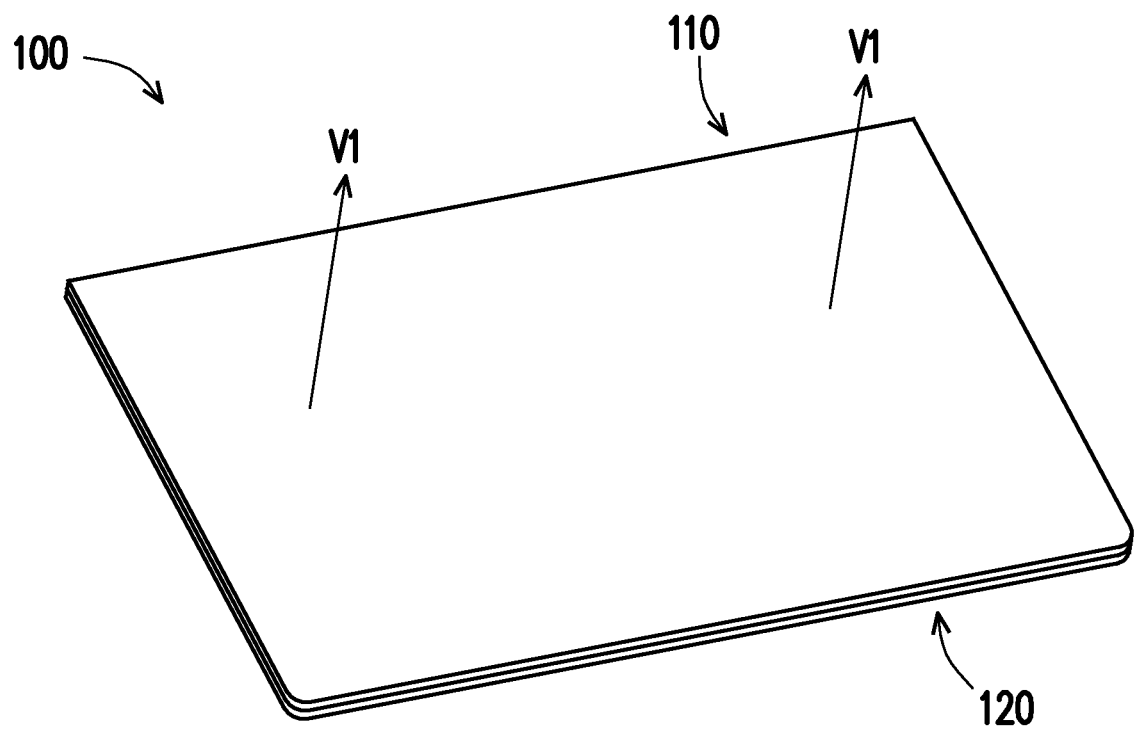
FIG. 2A is a perspective schematic view of the electronic device of FIG. 1A when closed.
Figure 2B:
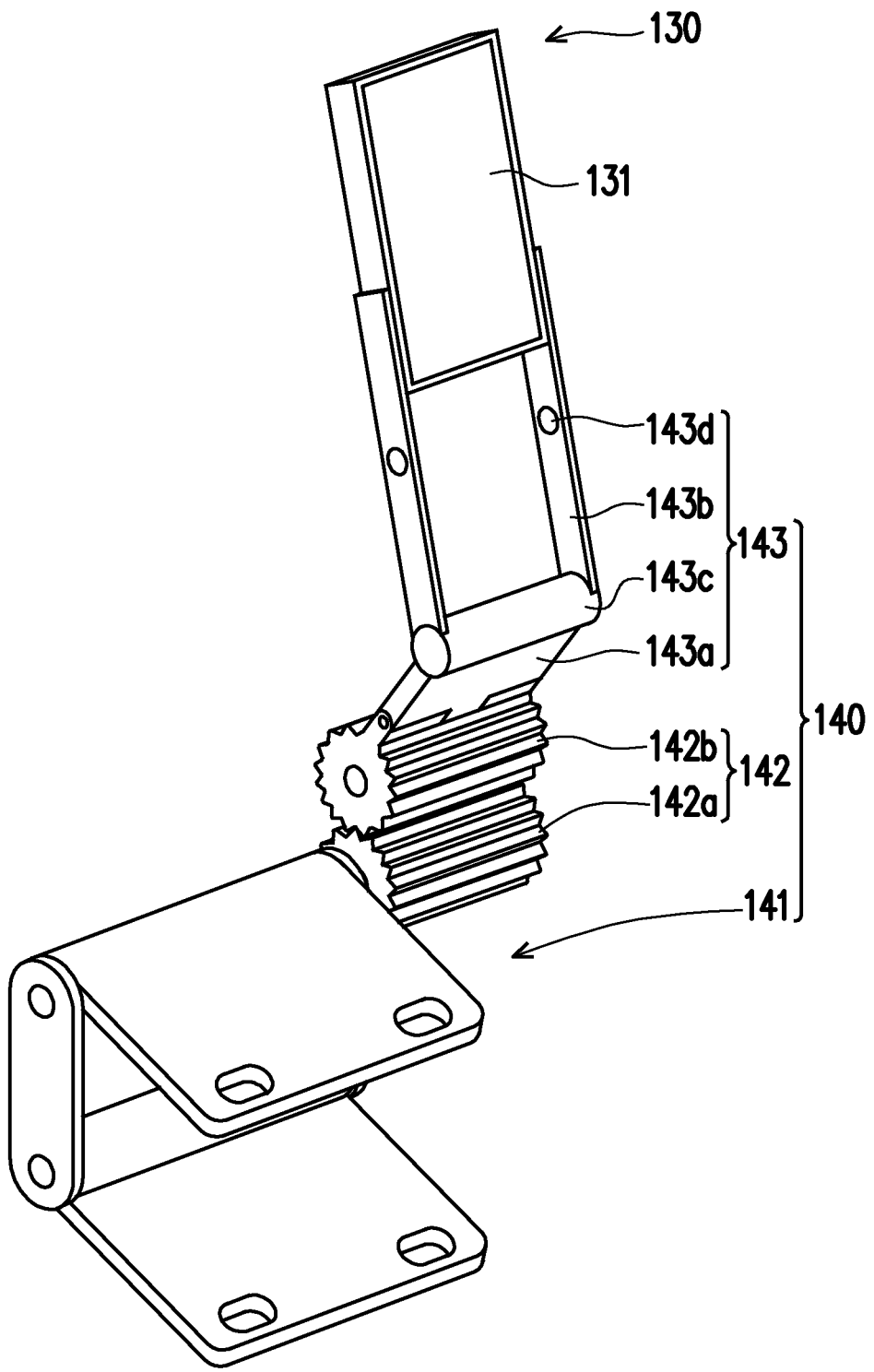
FIG. 2B is a perspective schematic view of a linkage mechanism of the electronic device of FIG. 2A.
Figure 2C:
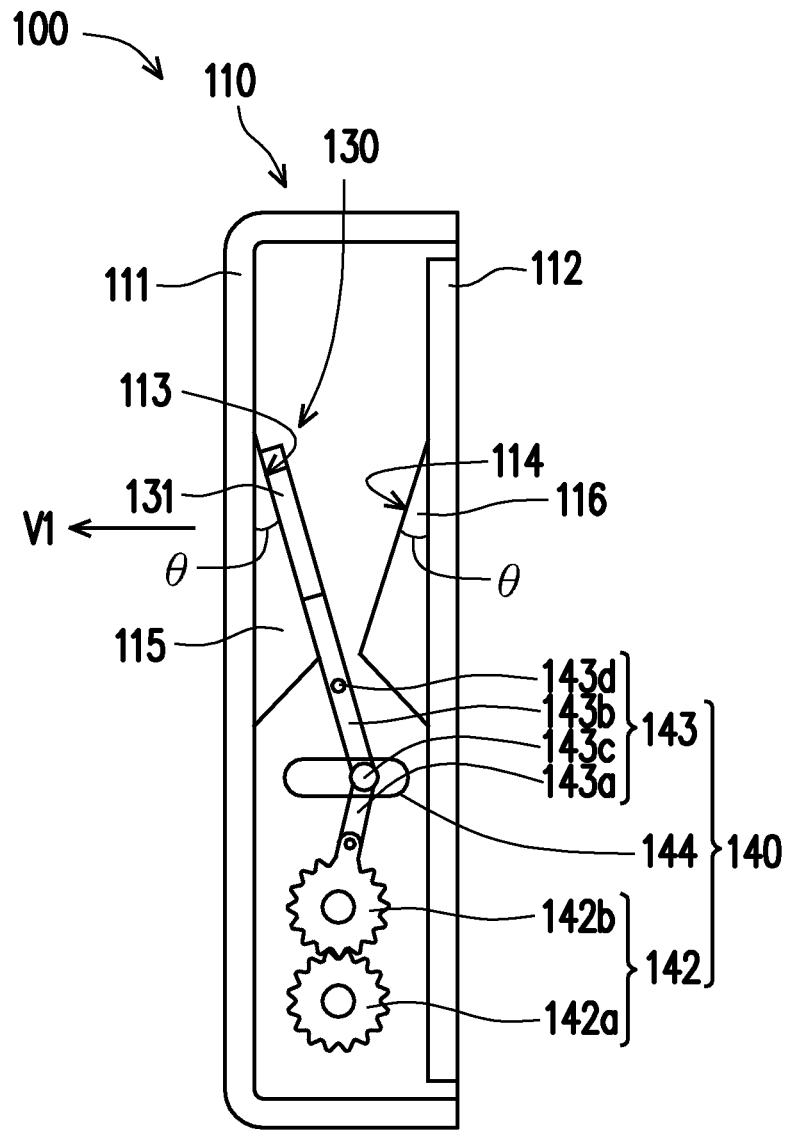
FIG. 2C is a partial cross section schematic view of the electronic device of FIG. 2A.

FIG. 2A is a perspective schematic view of the electronic device of FIG. 1A when closed. FIG. 2B is a perspective schematic view of a linkage mechanism of the electronic device of FIG. 2A. FIG. 2C is a partial cross section schematic view of the electronic device of FIG. 2A. Referring to FIG. 2A, FIG. 2B, and FIG. 2C, when the first body 110 is closed relative to the second body 120, and the speaker module 130 is abutted against the first surface 113 of the first body 110 located at the first housing 111, the speaker module 130 resonates with the first housing 111 to emit a first sound V1.

As shown in FIG. 1A, FIG. 1B, and FIG. 1C, when the first body 110 is unfolded relative to the second body 120, and the speaker module 130 is abutted against the second surface 114 of the second body 114 located at the second housing 112, the speaker module 130 resonates with the second housing 112 to emit a second sound V2.

In the present embodiment, the number and arrangement position of the speaker module 130 are not limited. For example, the number of the speaker module 130 may be one or a plurality. The speaker module 130 may be disposed at a body having a display screen, or may be disposed at a body having an input module such as a keyboard or a touch pad, depending on requirements.

With the above configuration, when the first body 110 of the electronic device 100 is unfolded relative to the second body 120 as shown in FIG. 1A, the second sound V2 generated by the speaker module 130 resonating with the second surface 114 of the first body 110 may be emitted from the side where the screen is located. At this time, the electronic device 100 may support an operation of a user in the general notebook computer mode.

In addition, when the first body 110 of the electronic device 100 is closed relative to the second body 120 as shown in FIG. 2A, the speaker module 130 may be automatically connected to the first surface 113 of the first body 110, such that the first sound V1 generated by the speaker module 130 resonating with the first surface 113 of the first body 110 may be emitted from the back side of the display screen. The electronic device 100 at this time may continue to operate and emit a sound for the user to listen to.

Therefore, when the first body 110 of the electronic device 100 is closed relative to the second body 120, the sound emitted by the speaker module 130 is not suffocated between the first body 110 and the second body 120, and the electronic device 100 may provide the user with more diverse modes of operation and more enjoyment.

For example, referring to FIG. 1A, FIG. 1B, and FIG. 1C, the speaker module 130 may be movably disposed in the first body 110 via the linkage mechanism 140, such that the speaker module 130 may be moved between the first surface 113 of the first body 110 and the second surface 114 of the first body 110.

In detail, the linkage mechanism 140 is connected to the first body 110. The speaker module 130 is further connected to the linkage mechanism 140. The linkage mechanism 140 is configured to drive the speaker module 130 to be abutted against the first surface 113 of the first body 110 or abutted against the second surface 114 of the first body 110.

More specifically, the linkage mechanism 140 includes a hinge module 141, a gear set 142 and a connecting rod set 143. The hinge module 141 is connected between the first body 110 and the second body 120, such that the first body 110 may be pivotally rotated relative to the second body 120. The gear set 142 is connected to the hinge module 141, and may be driven by the hinge module 141 to rotate when the first body 110 is pivotally rotated relative to the second body 120. The connecting rod set 143 is pivotally connected to the gear set 142 and may be driven by the gear set 142 to move when the first body 110 is pivotally rotated relative to the second body 120.

In more detail, the gear set 142 includes a first gear 142a and a second gear 142b. The first gear 142a is fixed to the hinge module 141 to be driven by the hinge module 141. The second gear 142b is pivotally disposed in the first body 110. The second gear 142b is engaged with the first gear 142a and pivotally connected to the connecting rod set 143.

On the other hand, the linkage mechanism 140 further includes a sliding recess 144 disposed at the first body 110. The connecting rod set 143 includes a first connecting rod 143a, a second connecting rod 143b, a first shaft 143c and a second shaft 143d. The first connecting rod 143a is pivotally connected to the second gear 142b of the gear set 142, and the first connecting rod 143a includes a telescopic rod. The first shaft 143c is connected between the first connecting rod 143a and the second connecting rod 143b, and slidably disposed in the sliding recess 144. The second shaft 143d is disposed at the first body 110. The second connecting rod 143b is further pivotally connected to the second shaft 143d to be pivotally rotated.

In addition, the speaker module 130 includes a speaker unit 131. The speaker module 130 is fixed to the second connecting rod 143b of the connecting rod set 143 to be moved with the second connecting rod 143b of the connecting rod set 143. The speaker module 130 is abutted against the first surface 113 of the first body 110 or abutted against the second surface 114 of the first body 110 via the speaker unit 131.

Furthermore, the first body 110 includes a first protrusion 115 and a second protrusion 116. The first protrusion 115 is protruded from the first housing 111, and the first surface 113 is located at the first protrusion 115. The second protrusion 116 is protruded from the second housing 112, and the second surface 114 is located at the second protrusion 116. An extending direction of the first surface 113 and an extending direction of the second housing 112 have an angle θ. An extending direction of the second surface 114 and the extending direction of the second housing 112 also have the angle θ.

In the present embodiment, the value of the angle θ between the extending direction of the first surface 113 and the extending direction of the second housing 112 is not limited, depending on requirements. Furthermore, the value of the angle θ between the extending direction of the second surface 114 and the extending direction of the second housing 112 is also not limited, and depends on requirements. Moreover, the values of the two angles θ may be the same or different, and may also be determined according to actual needs.

Referring to FIG. 1A, FIG. 1B, and FIG. 1C, during the process of the first body 110 pivotally rotating from the unfolded state of FIG. 1A to the closed state of FIG. 2A relative to the second body 120, the first body 110 drives the hinge module 141 to rotate. The hinge module 141 drives the first gear 142a of the gear set 142 to rotate. The first gear 142a drives the second gear 142b to rotate. The second gear 142b of the gear set 142 drives the first connecting rod 143a of the connecting rod set 143 to swing and change in length. The first connecting rod 143a drives the first shaft 143c to slide in the sliding recess 144 and drives the second connecting rod 143b to rotate. The second connecting rod 143b drives the speaker module 130 with the second shaft 143d as a pivot point, and is abutted against the first surface 113 of the first body 110 via the speaker unit 131. Thereby, the first sound V1 is emitted.

On the contrary, during the process that the first body 110 is pivotally rotated from the closed state of FIG. 2A to the unfolded state of FIG. 1A relative to the second body 120, the first body 110 drives the hinge module 141 to rotate. The hinge module 141 drives the first gear 142a of the gear set 142 to rotate. The first gear 142a drives the second gear 142b to rotate. The second gear 142b of the gear set 142 drives the first connecting rod 143a of the connecting rod set 143 to swing and change in length. The first connecting rod 143a drives the first shaft 143c to slide in the sliding recess 144 and drives the second connecting rod 143b to rotate. The second connecting rod 143b drives the speaker module 130 with the second shaft 143d as a pivot point, and is abutted against the second surface 114 of the first body 110 via the speaker unit 131. Thereby, the second sound V2 is emitted.

In short, in the electronic device 100 of the present embodiment, the speaker module 130 is movably disposed in the first body 110. The first body 110 has a first surface 113 and a second surface 114, and the first surface 113 and the second surface 114 are respectively located at two opposite sides of the speaker module 130. During the process of the first body 110 unfolding or closing relative to the second body 120, via the mechanism of the linkage mechanism 140, the speaker module 130 may be automatically moved and abutted against the first surface 113 of the first body 110 or abutted against the second surface 114 of the first body 110.

When the speaker module 130 is abutted against the first surface 113 of the first body 110, the speaker module 130 resonates with the first housing 111 to emit the first sound V1. The first sound V1 generated by the speaker module 130 resonating with the first surface 113 of the first body 110 located at the first housing 111 may be emitted from the back side of the display screen. The electronic device 100 in the closed state may still operate continuously and emit sound for the user to listen to.

When the speaker module 130 is abutted against the second surface 114 of the first body 110, the speaker module 130 resonates with the second housing 112 to emit the second sound V2. The second sound V2 generated by the speaker module 130 resonating with the second surface 114 of the first body 110 located at the second housing 112 may be emitted from a side where the display screen is located. At this time, the electronic device 100 may support the operation of the user in the general notebook computer mode.

Figure 3A:
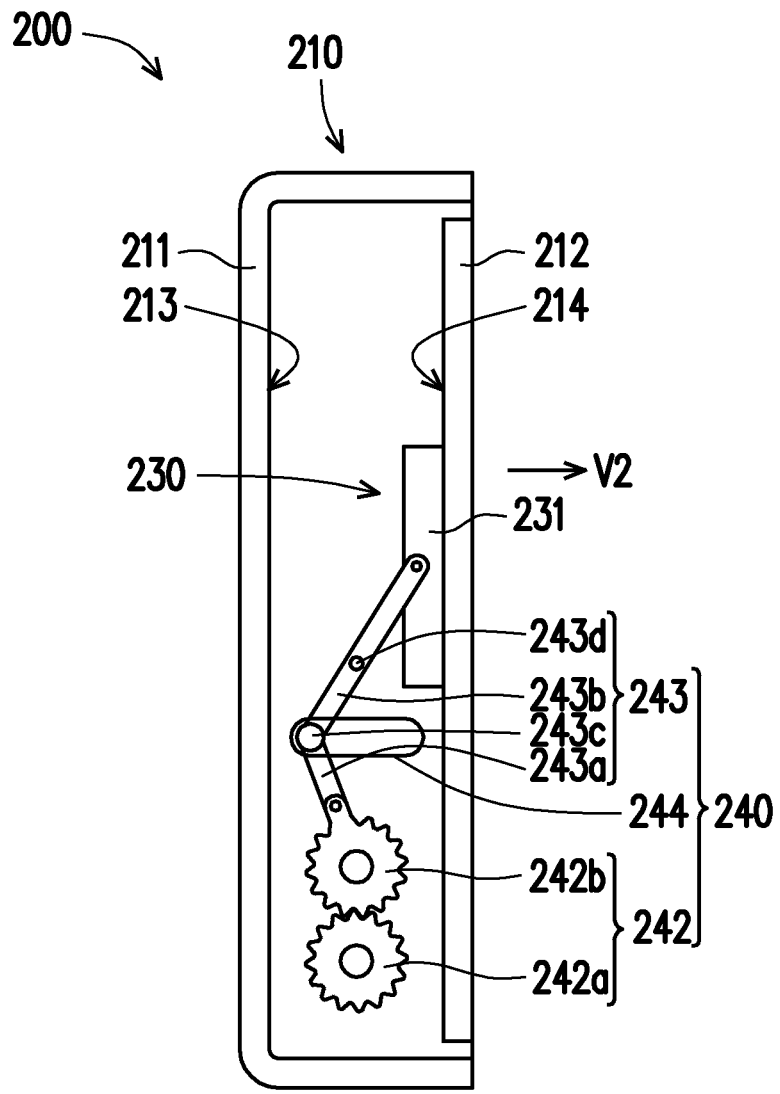
FIG. 3A and FIG. 3B are cross section schematic views of an electronic device of the second embodiment of the invention.
Figure 3B:
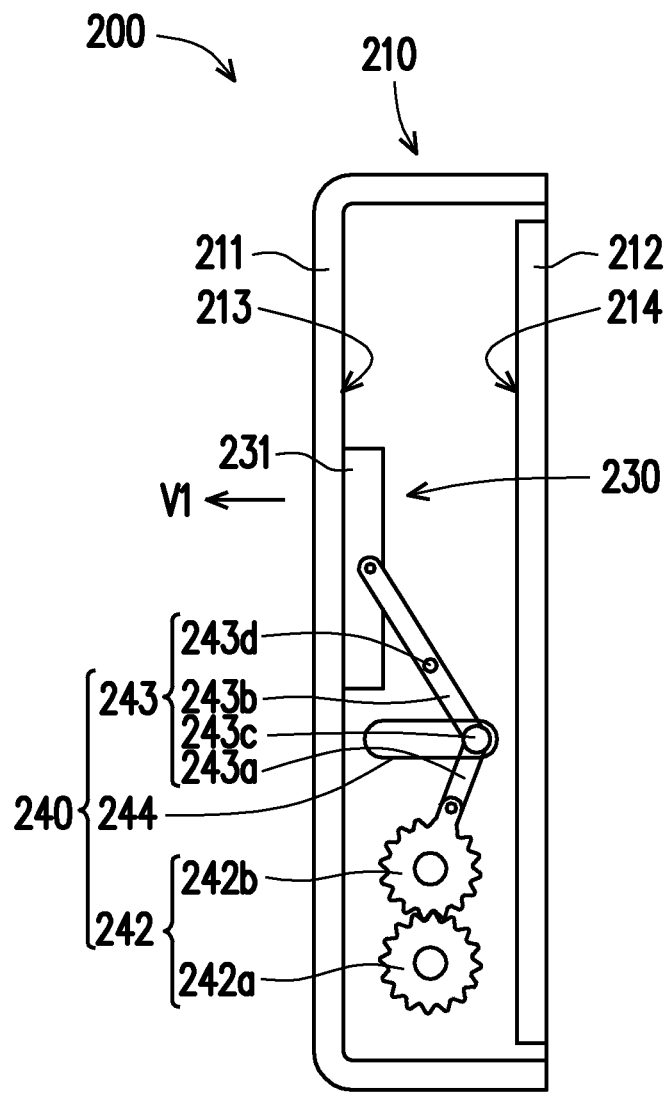

FIG. 3A and FIG. 3B are cross section schematic views of an electronic device of the second embodiment of the invention. In an electronic device 200 of the embodiment shown in FIG. 3A and FIG. 3B, the configuration and operation of a linkage mechanism 240, a gear set 242, a first gear 242a, a second gear 242b, a connecting rod set 243, a first connecting rod 243a, a second connecting rod 243b, a first shaft 243c, a second shaft 243d and a sliding recess 244 are the same as the configuration and operation of the linkage mechanism 140, the gear set 142, the first gear 142a, the second gear 142b, the connecting rod set 143, the first connecting rod 143a, the second connecting rod 143b, the first shaft 143c, the second shaft 143d and the sliding recess 144 in the electronic device 100 of the embodiment shown in FIG. 1C and FIG. 2C and are not repeated herein.

The electronic device 200 of the embodiment shown in FIG. 3A and FIG. 3B is different in that a first surface 213 of a first body 210 is located at a first housing 211, and an extending direction of the first surface 213 is parallel to an extending direction of a second housing 212. A second surface 214 of the first body 210 is located at the second housing 212, and an extending direction of the second surface 214 is parallel to the extending direction of the second housing 212. A speaker module 230 is pivotally connected to the second connecting rod 243b of the connecting rod set 243. In other words, the speaker unit 231 of the speaker module 230 of the present embodiment is connected to the first surface 213 of the first body 210 in parallel or connected to the second surface 214 of the first body 210 in parallel.

Figure 4:
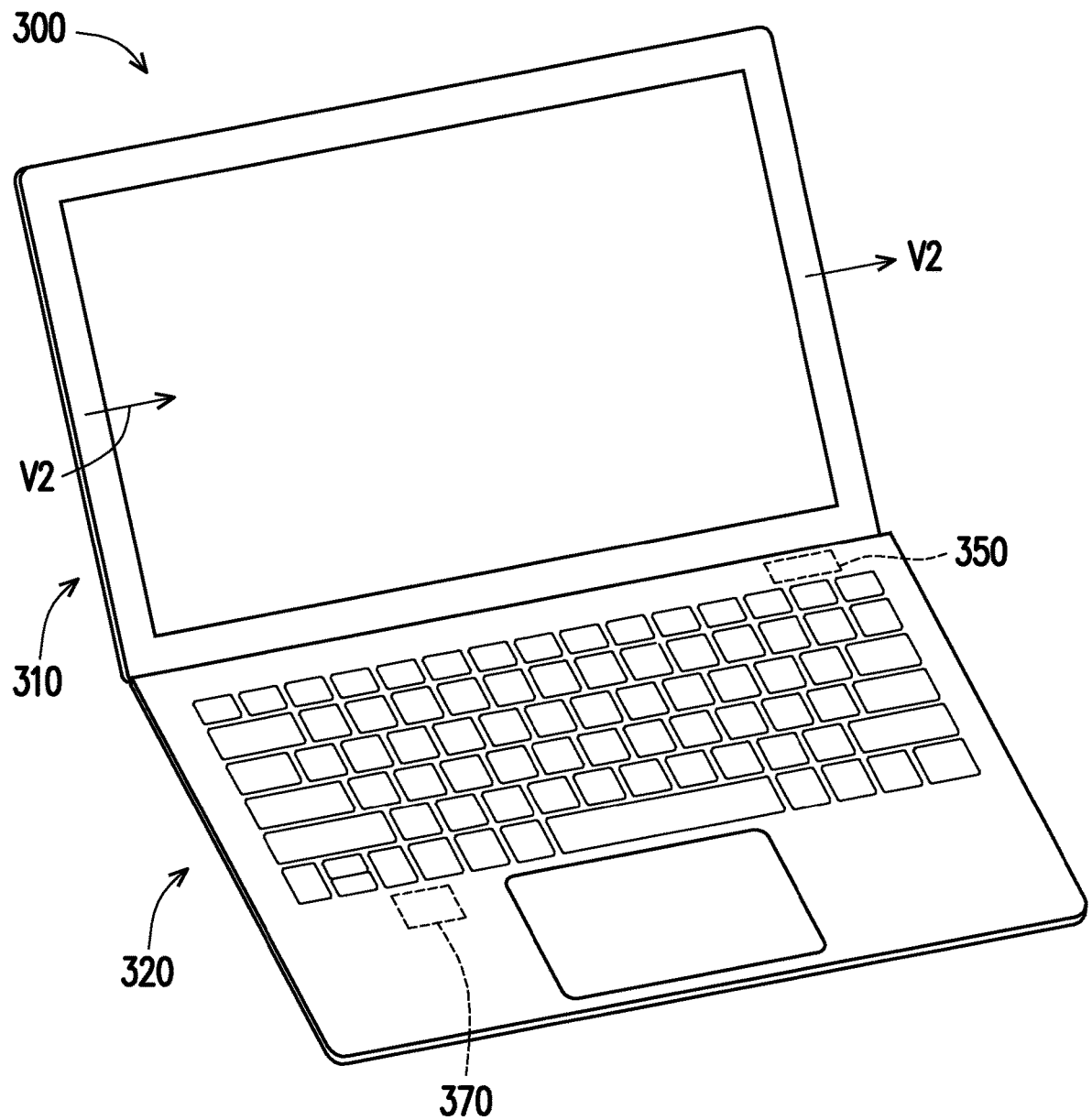
FIG. 4 is a perspective schematic view of an electronic device of the third embodiment of the invention.
Figure 5A:
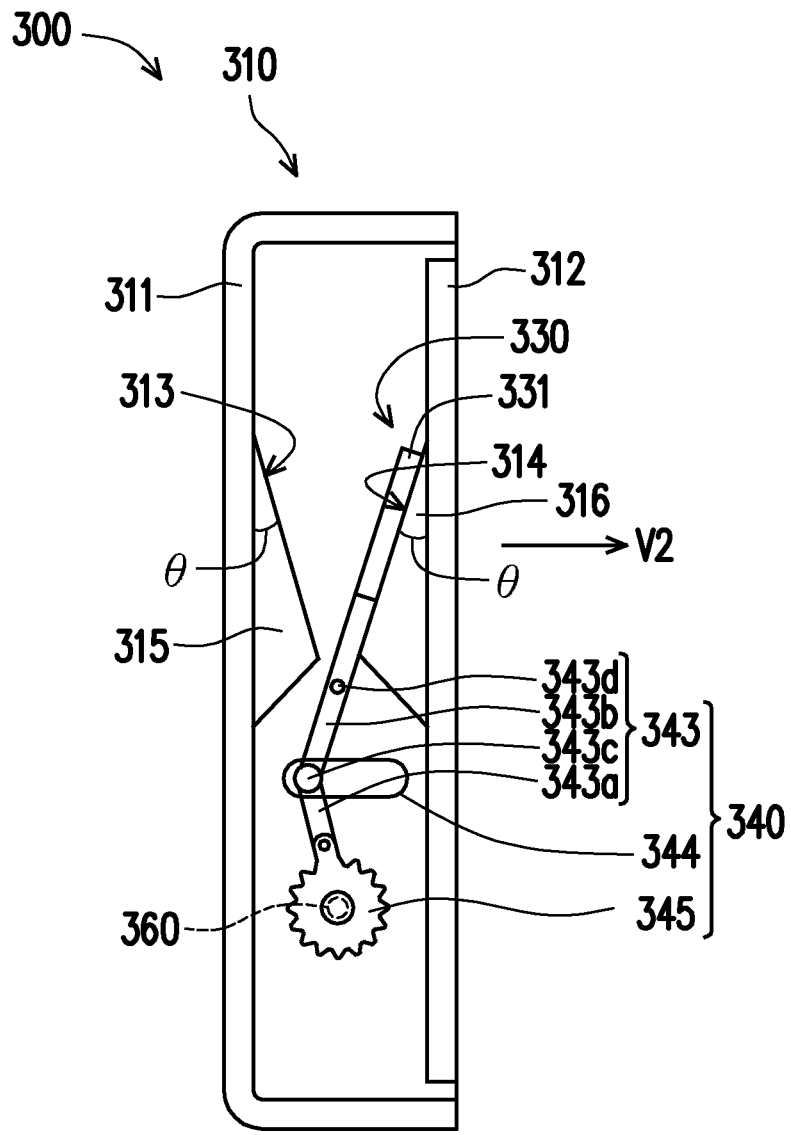
FIG. 5A and FIG. 5B are cross section schematic views of the electronic device of FIG. 4.
Figure 5B:
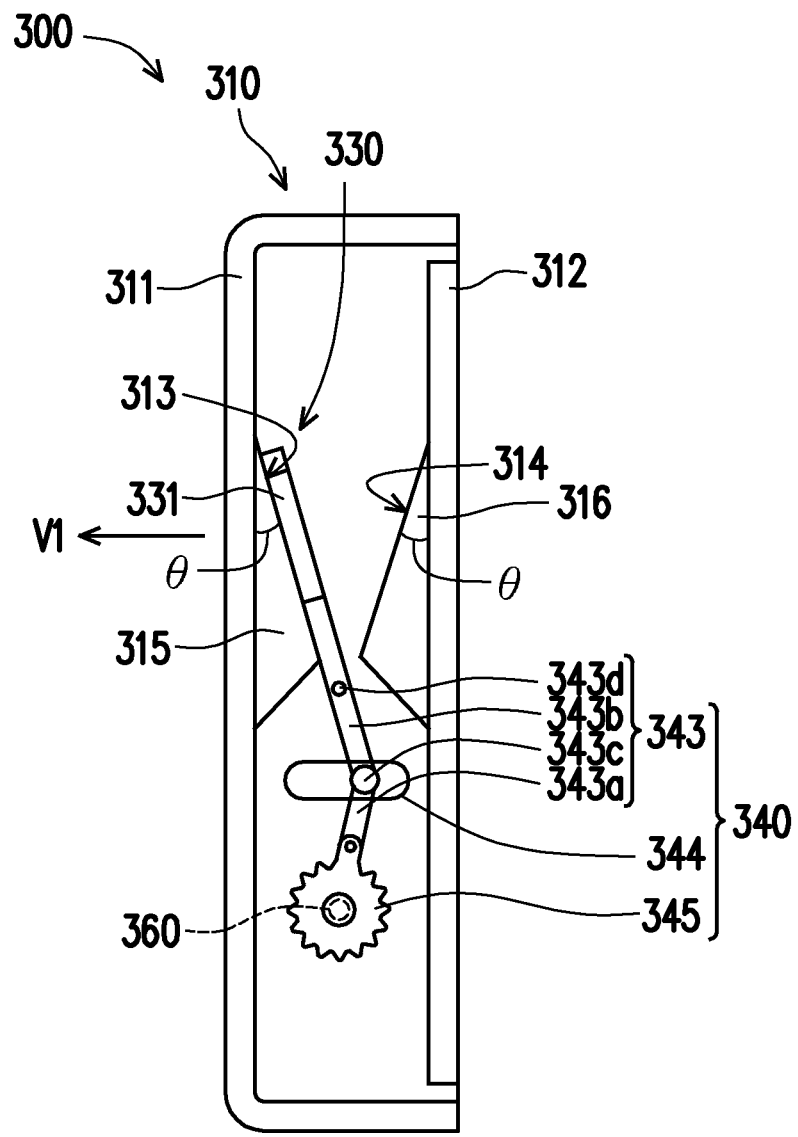

FIG. 4 is a perspective schematic view of an electronic device of the third embodiment of the invention. FIG. 5A and FIG. 5B are cross section schematic views of the electronic device of FIG. 4. In an electronic device 300 of the embodiment shown in FIG. 5A and FIG. 5B, the configuration and operation of a first body 310, a first housing 311, a second housing 312, a first surface 313, a second surface 314, a first protrusion 315, a second protrusion 316, a second body 320, a speaker module 330, a speaker unit 331, a connecting rod set 343, a first connecting rod 343a, a second connecting rod 343b, a first shaft 343c, a second shaft 343d and a sliding recess 344 are the same as the configuration and operation of the first body 110, the first housing 111, the second housing 112, the first surface 113, the second surface 114, the first protrusion 115, the second protrusion 116, the second body 120, the speaker module 130, the speaker unit 131, the connecting rod set 143, the first connecting rod 143a, the second connecting rod 143b, the first shaft 143c, the second shaft 143d and the sliding recess 144 in the electronic device 100 of the embodiments shown in FIG. 1A, FIG. 1C, and FIG. 2C and are not repeated herein.

The electronic device 300 of the embodiments shown in FIG. 4, FIG. 5A, and FIG. 5B is different in that the electronic device 300 further includes a sensing module 350, a driving module 360 and a processor 370. The driving module 360 is disposed in the first body 310 and connected to a gear 345 of a linkage mechanism 340. In other words, the driving module 360 is indirectly connected to the speaker module 330 via the linkage mechanism 340. The driving module 360 is configured to drive the gear 345 of the linkage mechanism 340 to rotate. The processor 370 is electrically connected to the sensing module 350 and the driving module 360. The processor 370 is configured to control the driving module 360 according to a signal provided by the sensing module 350, such that the driving module 360 drives the speaker unit 331 of the speaker module 330 to be abutted against the first surface 313 of the first body 310 or abutted against the second surface 314 of the first body 310.

In other words, the electronic device 300 of the present embodiment confirms the first body 310 is in an unfolded state or a closed state relative to the second body 320 via the processor 370 according to the signal transmitted by the sensing module 350 via an automatic sensing method. The processor 370 may further correspondingly drive the speaker module 330 to be abutted against the first surface 313 of the first body 310 or abutted against the second surface 314 of the first body 310 according to the signal transmitted by the sensing module 350.

In addition, the user may also make the processor 370 actuate the driving module 360 by manually inputting a command to control the speaker module 330 to be abutted against the first surface 313 of the first body 310 or abutted against the second surface 314 of the first body 310 without having the sensing module 350 automatically adjust the location of the speaker module 330. In other words, the electronic device 300 of the present embodiment may provide the modes of automatic adjustment and manual adjustment, and the user may select which mode to use according to requirements. Thereby, the user may be provided with a more diverse enjoyment. For example, in the notebook computer mode, the speaker module 330 resonates with the first surface 313 of the first body 310 to emit the first sound V1, such that the sound may be transmitted from the back side of the display screen.

Figure 5C:
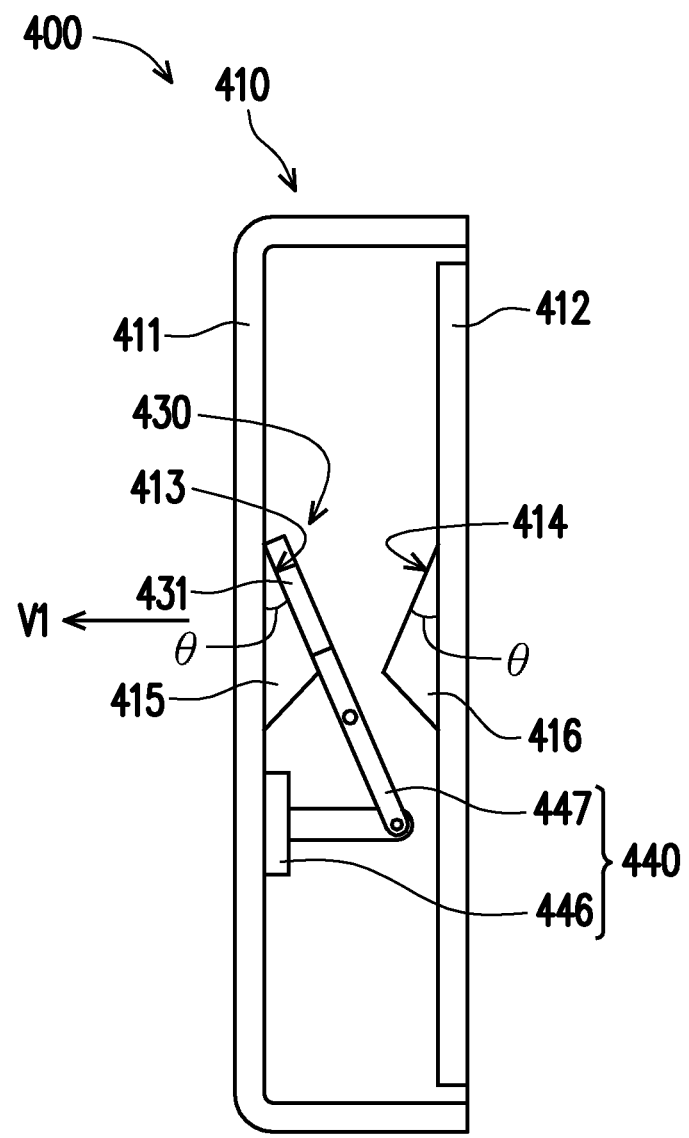
FIG. 5C and FIG. 5D are cross section schematic views of an electronic device of the fourth embodiment of the invention.
Figure 5D:
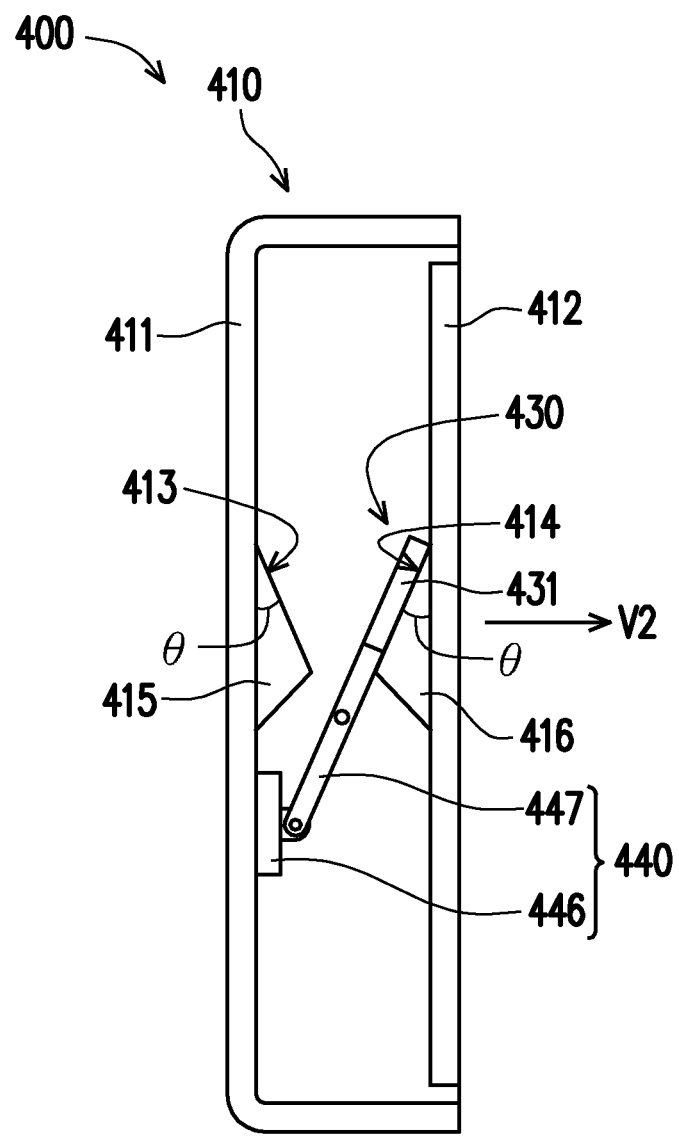

FIG. 5C and FIG. 5D are cross section schematic views of an electronic device of the fourth embodiment of the invention. In an electronic device 400 of the embodiment shown in FIG. 5A and FIG. 5B, the configuration and operation of a first body 410, a first housing 411, a second housing 412, a first surface 413, a second surface 414, a first protrusion 415, a second protrusion 416, a speaker module 430 and a speaker unit 431 are the same as the configuration and operation of the first body 110, the first housing 111, the second housing 112, the first surface 113, the second surface 114, the first protrusion 115, the second protrusion 116, the speaker module 130 and the speaker unit 131 in the electronic device 100 of the embodiments shown in FIG. 1C and FIG. 2C and are not repeated herein.

The electronic device 400 of the embodiment shown in FIG. 5C and FIG. 5D is different in that a linkage mechanism 440 includes a power source 446 and a connecting rod 447. The power source 446 is disposed at the first body 410. The connecting rod 447 is pivotally connected to the power source 446 and the first body 410. The power source 446 may drive the connecting rod 447 to swing by expansion and contraction, thereby the speaker unit 431 of the speaker module 430 is abutted against the first surface 413 of the first body 410 or abutted against the second surface 414 of the first body 410.

Figure 6A:
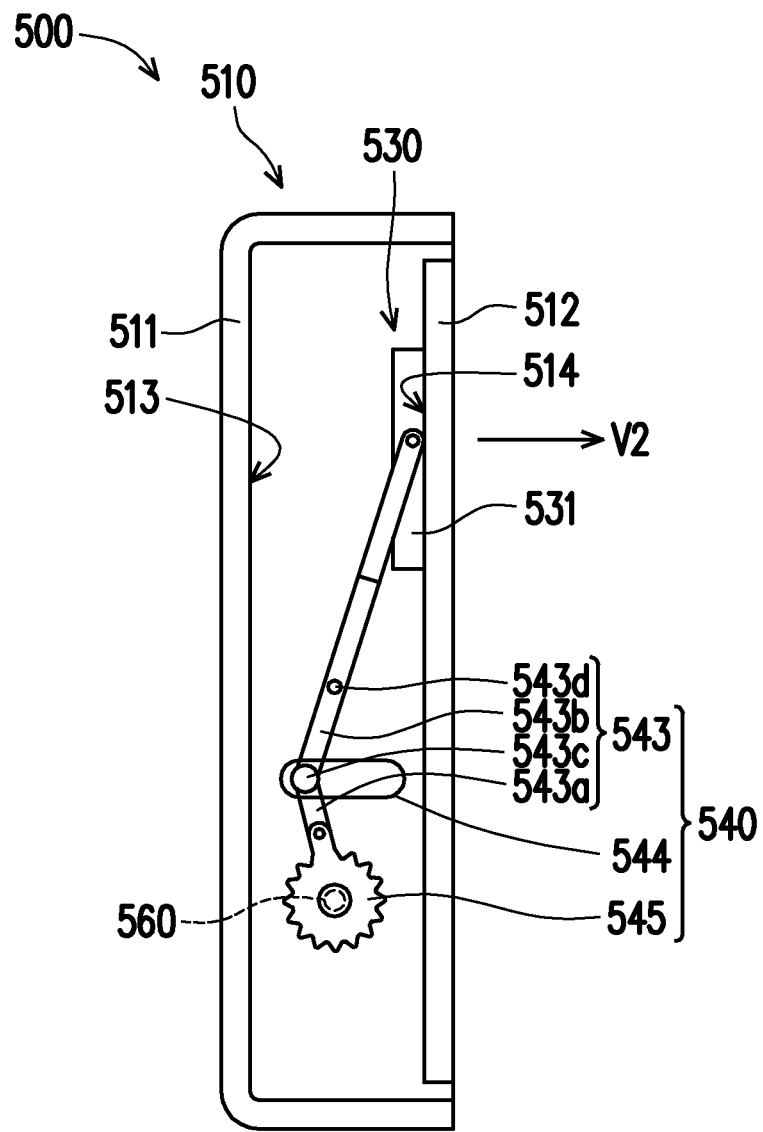
FIG. 6A and FIG. 6B are cross section schematic views of an electronic device of the fifth embodiment of the invention.
Figure 6B:
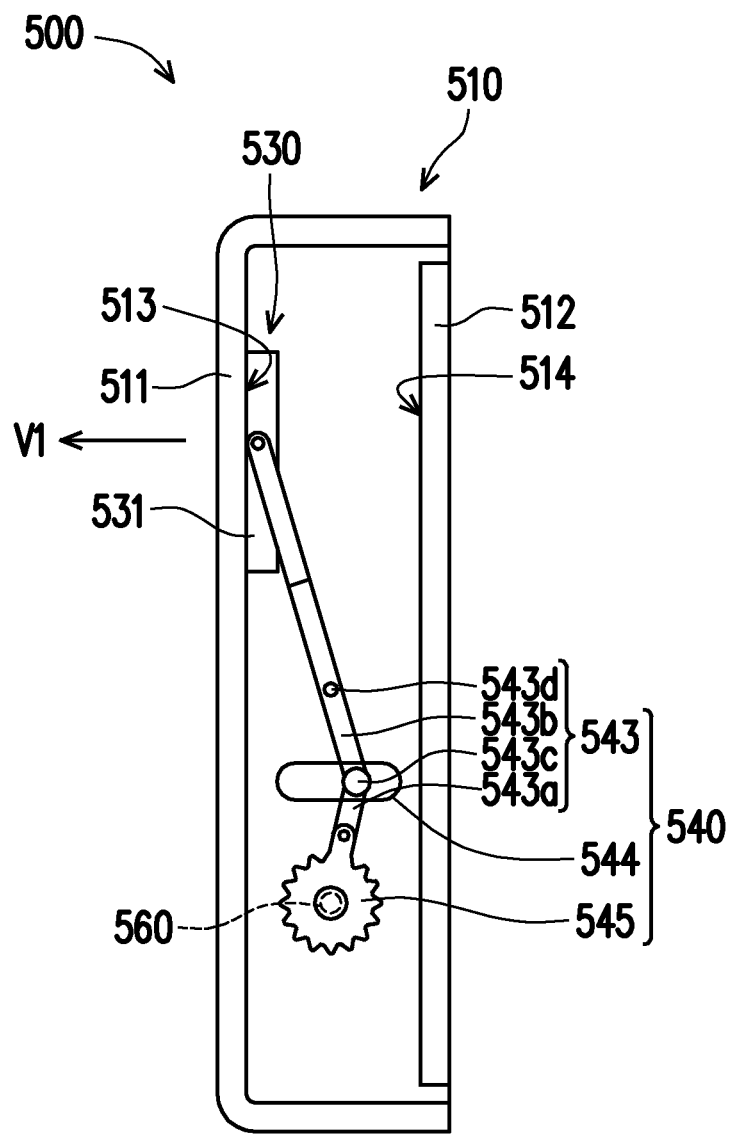

FIG. 6A and FIG. 6B are cross section schematic views of an electronic device of the fifth embodiment of the invention. In an electronic device 500 of the embodiment shown in FIG. 6A and FIG. 6B, the configuration and operation of a linkage mechanism 540, a connecting rod set 543, a first connecting rod 543a, a second connecting rod 543b, a first shaft 543c, a second shaft 543d, a sliding recess 544, a gear 545 and a driving module 560 are the same as the configuration and operation of the second body 320, the linkage mechanism 340, the connecting rod set 343, the first connecting rod 343a, the second connecting rod 343b, the first shaft 343c, the second shaft 343d, the sliding recess 344, the gear 345 and the driving module 360 in the electronic device 300 of the embodiment shown in FIG. 5A and FIG. 5B and are not repeated herein.

The electronic device 500 of the embodiment shown in FIG. 6A and FIG. 6B is different in that a first surface 513 of the first body 510 is located at a first housing 511, and an extending direction of the first surface 513 is parallel to an extending direction of a second housing 512. A second surface 514 of the first body 510 is located at the second housing 512, and an extending direction of the second surface 514 is parallel to the extending direction of the second housing 512. A speaker module 530 is pivotally connected to the second connecting rod 543b of the connecting rod set 543. In other words, a speaker unit 531 of the speaker module 530 of the present embodiment is connected to the first surface 513 of the first body 510 in parallel or connected to the second surface 514 of the first body 510 in parallel.

Figure 7:
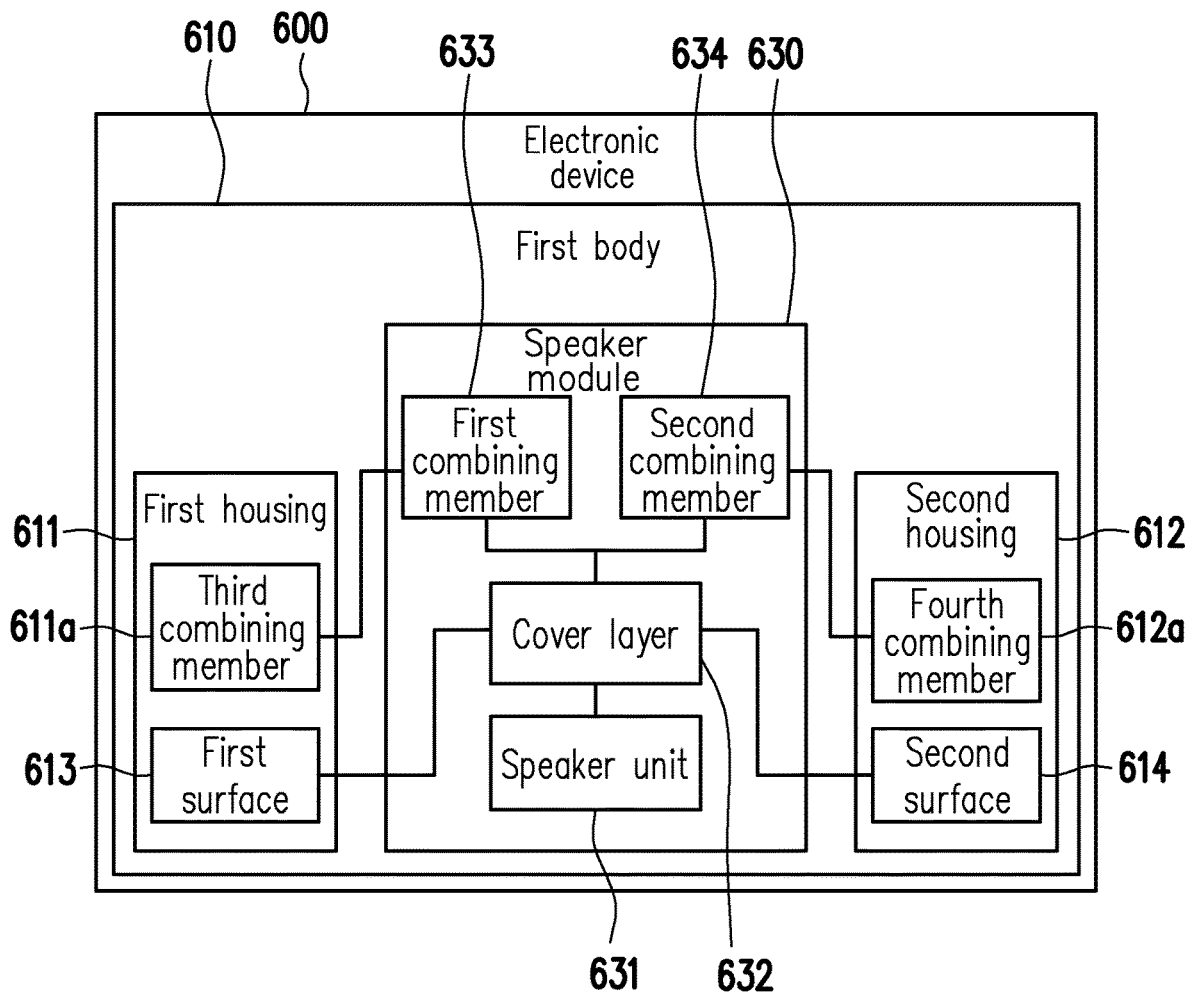
FIG. 7 is a block diagram of a structure of an electronic device of the sixth embodiment of the invention.

FIG. 7 is a block diagram of a structure of an electronic device of the sixth embodiment of the invention. Referring to FIG. 7, in an electronic device 600 of the present embodiment, a speaker module 630 includes a speaker unit 631 and a cover layer 632 covered on the outside of the speaker unit 631. The speaker module 630 is abutted against a first surface 613 of the first body 610 or abutted against a second surface 614 of the first body 610 via the cover layer 632. The speaker module 630 may further include a first combining member 633 and a second combining member 634. The first housing 611 has a third combining member 611a cooperating with the first combining member 633. The second housing 612 has a fourth combining member 612a cooperating with the second combining member 634. The speaker module 630 is combined with the third combining member 611a via the first combining member 633, or the speaker module 630 is combined with the fourth combining member 612a via the second combining member 634. The first combining member 633, the second combining member 634, the third combining member 611a, and the fourth combining member 612a are, for example, permanent magnets or electromagnets, and the present embodiment is not limited.

Based on the above, in the electronic device of the invention, the speaker module is movably disposed in the first body via the mechanical structure. The first body has the first surface and the second surface, and the first surface and the second surface are respectively located at opposite sides of the speaker module. During the process of the first body unfolding or closing relative to the second body, via the mechanical structure and/or automatic sensing adjustment, the speaker module may be automatically moved and abutted against the first surface of the first body or abutted against the second surface of the first body. When the speaker module is abutted against the first surface of the first body, the speaker module resonates with the first housing to emit the first sound. The first sound generated by the speaker module resonating with the first surface of the first body located at the first housing may be emitted from the back side of the display screen. The electronic device in the closed state may still operate continuously and emit sound for the user to listen to. When the speaker module is abutted against the second surface of the first body, the speaker module resonates with the second housing to emit the second sound. The second sound generated by the speaker module resonating with the second surface of the first body located at the second housing may be emitted from the side where the display screen is located. At this time, the electronic device may support the operation of the user in the regular notebook mode.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An electronic device, comprising:
a first body, comprising a first housing and a second housing disposed on the first housing;
a second body, pivotally connected to the first body; and
a speaker module, movably disposed in the first body,
wherein the first body has a first surface and a second surface, the first surface and the second surface are respectively located at two opposite sides of the speaker module, when the speaker module is abutted against the first surface, the speaker module resonates with the first housing to emit a first sound in a first direction, and when the speaker module is abutted against the second surface, the speaker module resonates with the second housing to emit a second sound in a second direction opposite to the first direction.

2. The electronic device of claim 1, further comprising a linkage mechanism, the linkage mechanism is connected to the first body, the speaker module is connected to the linkage mechanism, and the linkage mechanism drives the speaker module to be abutted against the first surface or abutted against the second surface.

3. The electronic device of claim 2, wherein the first body is closed relative to the second body, and the speaker module is abutted against the first surface.

4. The electronic device of claim 2, wherein the first body is unfolded relative to the second body, and the speaker module is abutted against the second surface.

5. The electronic device of claim 2, wherein the linkage mechanism comprises:
a hinge module, connected between the first body and the second body;
a gear set, connected to the hinge module; and
a connecting rod set, pivotally connected to the gear set, wherein the speaker module is fixed to the connecting rod set or pivotally connected to the connecting rod set.

6. The electronic device of claim 5, wherein the gear set comprises:
a first gear, fixed to the hinge module; and
a second gear, engaged with the first gear and pivotally connected to the connecting rod set.

7. The electronic device of claim 6, wherein the first body drives the hinge module to rotate, the hinge module drives the first gear to rotate, the first gear drives the second gear to rotate, the second gear drives the connecting rod set to move, and the connecting rod set drives the speaker module to be abutted against the first surface or abutted against the second surface.

8. The electronic device of claim 5, wherein the linkage mechanism further comprises a sliding recess disposed at the first body, the connecting rod set comprising:

a first connecting rod, pivotally connected to the gear set;
a second connecting rod;
a first shaft, connected between the first connecting rod and the second connecting rod, and slidably disposed in the sliding recess; and
a second shaft, disposed at the first body, and the second connecting rod is pivotally connected to the second shaft,
wherein the speaker module is fixed to the second connecting rod or pivotally connected to the second connecting rod.

9. The electronic device of claim 8, wherein the first connecting rod comprises a telescopic rod.

10. The electronic device of claim 8, wherein the first body drives the hinge module to rotate, the hinge module drives the gear set to rotate, the gear set drives the first connecting rod to swing, the first connecting rod drives the second connecting rod to rotate, and the second connecting rod drives the speaker module to be abutted against the first surface or abutted against the second surface.

11. The electronic device of claim 2, wherein the linkage mechanism comprises:
a power source, disposed at the first body; and
a connecting rod, pivotally connected to the power source and pivotally connected to the first body.

12. The electronic device of claim 11, wherein the power source pushes the connecting rod to swing, such that the connecting rod drives the speaker module to be abutted against the first surface or abutted against the second surface.

13. The electronic device of claim 1, wherein an extending direction of the first surface, an extending direction of the second surface, and an extending direction of the second housing are parallel to each other.

14. The electronic device of claim 1, wherein an extending direction of the first surface and an extending direction of the second housing have an angle, and an extending direction of the second surface and the extending direction of the second housing have the angle.

15. The electronic device of claim 1, wherein the first body comprises:
a first protrusion, protruding from the first housing, and the first surface is located at the first protrusion; and
a second protrusion, protruded from the second housing, and the second surface is located at the second protrusion.

16. The electronic device of claim 1, wherein the first housing has the first surface, and the second housing has the second surface.

17. The electronic device of claim 1, wherein the speaker module comprises a speaker unit, and the speaker module is abutted against the first surface or abutted against the second surface via the speaker unit.

18. The electronic device of claim 1, further comprising:
a sensing module;
a driving module, disposed in the first body, and connected to the speaker module; and
a processor, electrically connected to the sensing module and the driving module, and the processor is configured to control the driving module according to a signal provided by the sensing module, such that the driving module drives the speaker module to be abutted against the first surface or abutted against the second surface.

19. The electronic device of claim 1, wherein the speaker module comprises a speaker unit and a cover layer covered on an outside of the speaker unit, and the speaker module is abutted against the first surface or abutted against the second surface via the cover layer.

20. The electronic device of claim 19, wherein the speaker module has a first combining member and a second combining member, the first housing has a third combining member cooperating with the first combining member, the second housing has a fourth combining member cooperating with the second combining member, and the speaker module is combined with the third combining member via the first combining member, or the speaker module is combined with the fourth combining member via the second combining member.

* * * * *